(12) United States Patent
Regalado et al.

(10) Patent No.: US 10,717,417 B2
(45) Date of Patent: Jul. 21, 2020

(54) VEHICLE WATER COLLECTION SYSTEM

(71) Applicant: FORD GLOBAL TECHNOLOGIES, LLC, Dearborn, MI (US)

(72) Inventors: Adrian Romero Regalado, Cuautitian Izcalli (MX); Mario Oscar Martinez Ordaz, Mexico City (MX); Mariana Ceballos Rodriguez, Toluca (MX); Ever Rafael Diaz Gutierrez, Nogales (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 367 days.

(21) Appl. No.: 15/485,513

(22) Filed: Apr. 12, 2017

(65) Prior Publication Data

US 2018/0297561 A1    Oct. 18, 2018

(51) Int. Cl.
*B60S 1/50* (2006.01)
*B01D 36/00* (2006.01)

(52) U.S. Cl.
CPC .............. *B60S 1/50* (2013.01); *B01D 36/008* (2013.01)

(58) Field of Classification Search
None
See application file for complete search history.

(56) References Cited

U.S. PATENT DOCUMENTS

| | | | |
|---|---|---|---|
| 3,738,575 A * | 6/1973 | Somer | B60S 1/50 239/284.1 |
| 6,024,803 A | 2/2000 | Buchanan, Jr. et al. | |
| 6,703,944 B1 * | 3/2004 | Obradovich | B60R 16/0231 340/903 |
| 2011/0128543 A1 * | 6/2011 | Choi | B60S 1/0833 356/342 |

FOREIGN PATENT DOCUMENTS

| | | |
|---|---|---|
| CN | 201087494 Y | 7/2008 |
| CN | 102182224 A | 9/2011 |
| CN | 202519738 U | 11/2012 |
| DE | 202010008695 U1 | 11/2010 |
| GB | 2276129 A | 9/1994 |
| GB | 2315994 A | 2/1998 |
| JP | 2009248773 A | 10/2009 |
| WO | 2007/118468 A1 | 10/2007 |
| WO | 2011/154728 A1 | 12/2011 |

* cited by examiner

*Primary Examiner* — Rita P Adhlakha
(74) *Attorney, Agent, or Firm* — David Coppiellie; Carlson, Gaskey & Olds

(57) ABSTRACT

A vehicle includes a water collection system including a deployable channel movable between a stowed position and a deployed position for capturing water, a filter for filtering the water collected by the deployable channel, and a tank for storing the water filtered by the filter.

21 Claims, 5 Drawing Sheets

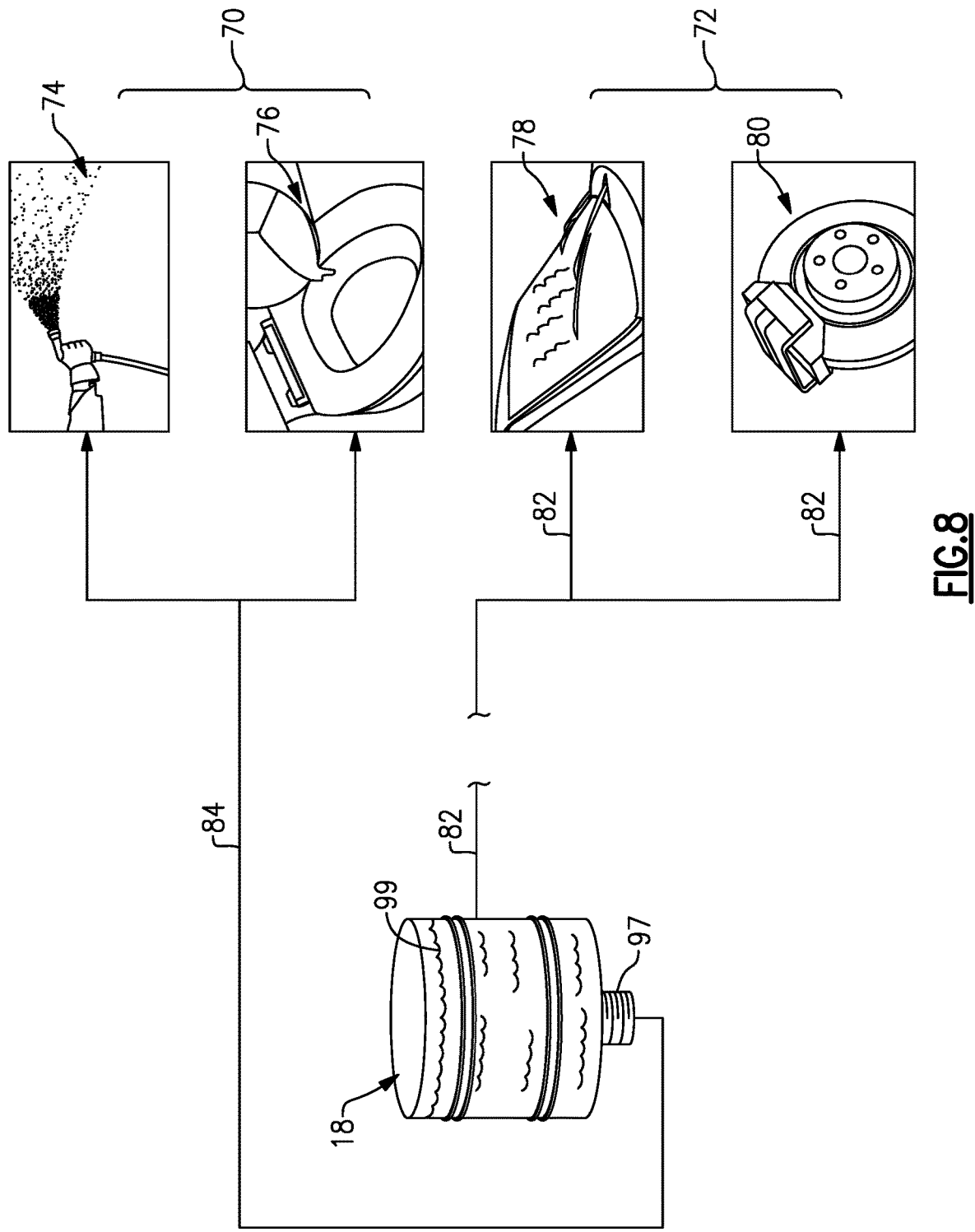

VEHICLE WATER COLLECTION SYSTEM

TECHNICAL FIELD

This disclosure relates to a vehicle water collection system. An exemplary water collection system collects and stores water for various vehicle and non-vehicle uses.

BACKGROUND

Water is becoming a scarce resource. Recycling can save many liters of water per year. However, only a small percentage of the world population recycles water. Prior efforts to collect and recycle water that falls on and around a motor vehicle (e.g., rainwater, car wash water, etc.) have not been successful.

SUMMARY

A vehicle according to an exemplary aspect of the present disclosure includes, among other things, a water collection system including a deployable channel movable between a stowed position and a deployed position for capturing water, a filter for filtering the water collected by the deployable channel, and a tank for storing the water filtered by the filter.

In a further non-limiting embodiment of the foregoing vehicle, the vehicle includes a stationary channel for capturing water.

In a further non-limiting embodiment of either of the foregoing vehicles, the deployable channel is mounted near a rear wheel of the vehicle.

In a further non-limiting embodiment of any of the foregoing vehicles, a control system is adapted to command movement of the deployable channel from the stowed position to the deployed position in response to detecting the presence of water.

In a further non-limiting embodiment of any of the foregoing vehicles, a sensor is adapted to detect the presence of the water.

In a further non-limiting embodiment of any of the foregoing vehicles, the sensor is a light refraction sensor.

In a further non-limiting embodiment of any of the foregoing vehicles, an actuator is adapted to move the deployable channel from the stowed position to the deployed position.

In a further non-limiting embodiment of any of the foregoing vehicles, tubing fluidly connects the deployable channel to the filter.

In a further non-limiting embodiment of any of the foregoing vehicles, tubing fluidly connects the filter to the tank.

In a further non-limiting embodiment of any of the foregoing vehicles, the deployable channel is mounted horizontally between rear wheels of the vehicle.

In a further non-limiting embodiment of any of the foregoing vehicles, a stationary channel is mounted longitudinally between the rear wheels and front wheels of the vehicle.

In a further non-limiting embodiment of any of the foregoing vehicles, the tank includes a drain.

In a further non-limiting embodiment of any of the foregoing vehicles, the deployable channel is curved to establish a trough for capturing and channeling the water.

In a further non-limiting embodiment of any of the foregoing vehicles, the vehicle includes a human machine interface having an actuator for commanding the deployable channel to the deployed position.

In a further non-limiting embodiment of any of the foregoing vehicles, the deployable channel is mounted to a portion of a chassis of the vehicle.

A method according to another exemplary aspect of the present disclosure includes, among other things, automatically moving a channel of a water collection system of a vehicle from a stowed position to a deployed position in response to either sensing water on the vehicle or receiving a user command to deploy the channel.

In a further non-limiting embodiment of the forgoing method, the method includes, after moving the channel to the deployed position, collecting the water in the channel, filtering the water, and storing the water in a tank of the water collection system.

In a further non-limiting embodiment of either of the foregoing methods, the method includes using the water stored in the tank for a non-vehicle use or a vehicle use.

In a further non-limiting embodiment of any of the foregoing methods, the vehicle use includes cleaning a window of the vehicle or cooling a brake of the vehicle.

In a further non-limiting embodiment of any of the foregoing methods, receiving the user command occurs in response to the user actuating an actuator located on a human machine interface (HMI) of the vehicle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 8 schematically illustrates exemplary uses for recycling water collected and stored by a vehicle water collection system.

DETAILED DESCRIPTION

This disclosure details vehicle water collection systems for collecting water, such as rainwater or water used when washing a vehicle. An exemplary water collection system includes a plurality of channels configured to collect water, a filter for filtering the collected water, and a tank for storing the filtered water. One or more channels of the plurality of channels is moveable between a stowed position and a deployed position for collecting the water. These and other features of this disclosure are described in greater detail below.

Figure 1:
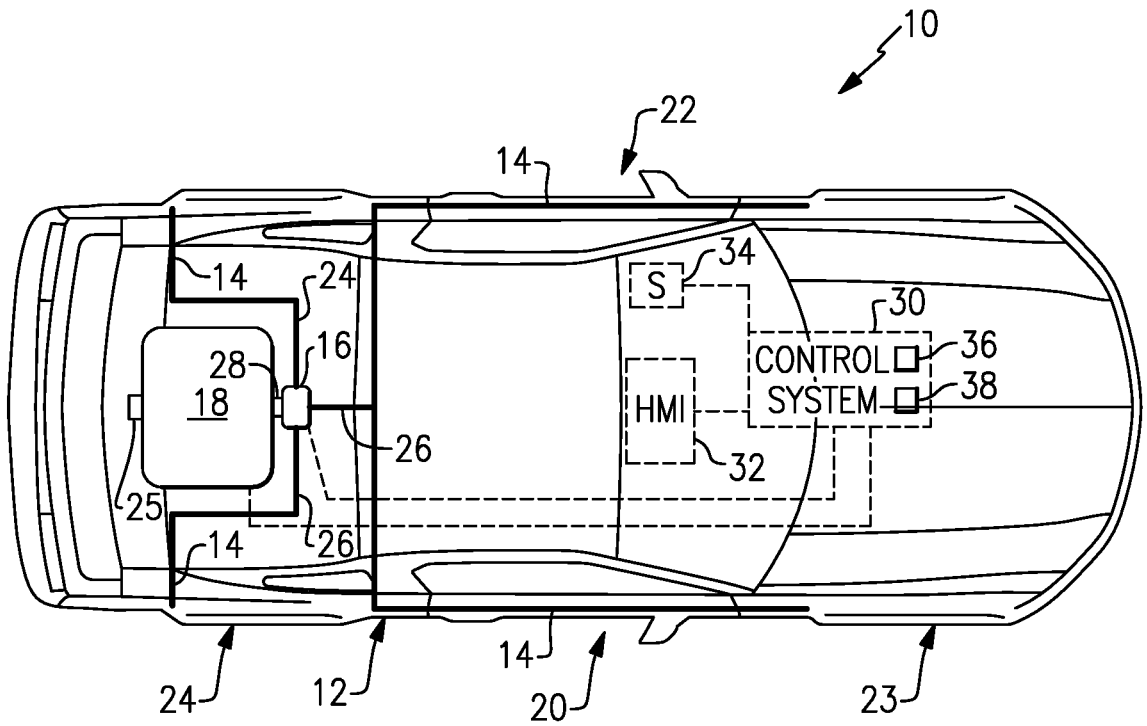
FIG. 1 is a top view of a vehicle equipped with a water collection system.
Figure 2:
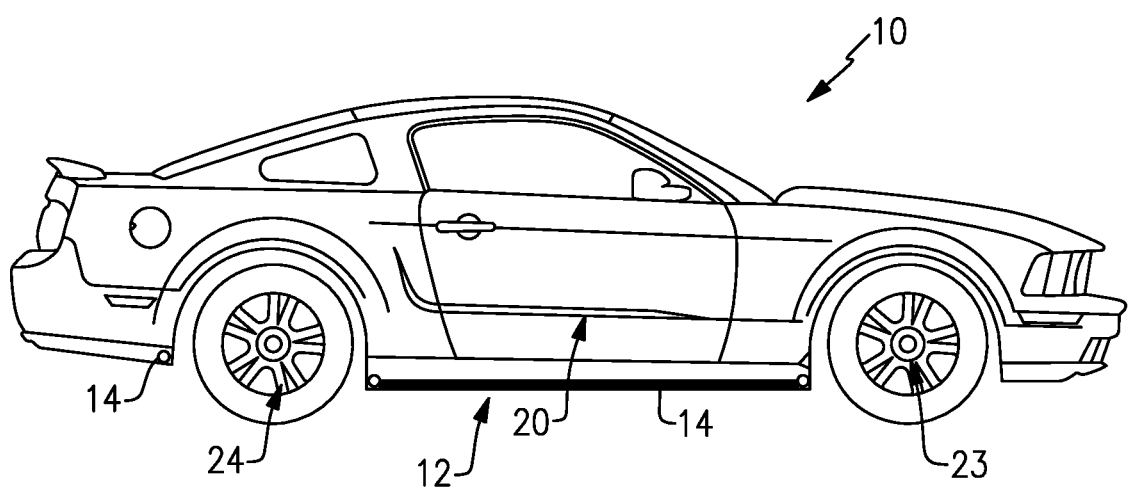
FIG. 2 is a side view of the vehicle of FIG. 1.

FIGS. 1 and 2 schematically illustrate a vehicle 10 equipped with a water collection system 12. The vehicle 10 is depicted as a car in this non-limiting embodiment. However, trucks, vans, or any other automotive vehicles could also benefit from the teachings of this disclosure. Moreover, although specific component relationships are illustrated in these figures, the illustrations are not intended to limit this disclosure. In other words, the placement and orientation of the various components of the water collection system 12 of the vehicle 10 are shown schematically and could vary within the scope of this disclosure.

The water collection system 12 is arranged within the vehicle 10 for capturing water, such as rainwater, water that has been used to wash the vehicle 10, or any other water that comes into contact with the vehicle 10. The collected water may be stored and then recycled for various vehicle or non-vehicle applications. Exemplary vehicle uses for the water collected by the water collection system 12 include for cleaning the vehicle windshield or cooling the vehicle brakes (see, for example, FIG. 8). Exemplary non-vehicle uses for the water collected by the water collection system 12 include gardening or general household uses.

The water collection system 12 may include a plurality of channels 14 for collecting water, a filter 16 for filtering the water collected by the channels 14, and a tank 18 for storing the water filtered by the filter 16. A first portion of the channels 14 may extend longitudinally along each side 20, 22 of the vehicle 10 at a location between front wheels 23 and rear wheels 24 of the vehicle 10. A second portion of the channels 14 may extend horizontally between the sides 20, 22 of the vehicle 10 at a location just behind the rear wheels 24 of the vehicle 10. The channels 14 could be positioned at any location of the vehicle 10 for catching the water that falls on, around, and/or through the vehicle 10, such as during rainfall events or car washing event, for example.

In a non-limiting embodiment, the channels 14 are metallic or plastic structures that are mounted to the vehicle 10 and are adapted to catch and carry the collected water to the filter 16 and/or the tank 18. The channels 14 may be mounted to various structures of the vehicle 10 and are generally hidden from view (i.e., not clearly visible when viewing the vehicle 10 from nearby). The channels 14 are specifically sized and shaped to catch and channel water; however, the actual size and shape of each channel 14 is not intended to limit this disclosure. The channels 14 are not necessarily shown to scale in the highly schematic depictions of FIGS. 1 and 2.

In another non-limiting embodiment, one or more tubes 26 may optionally be used to connect the channels 14 to the filter 16 and/or tank 18 of the water collection system 12. The tubes 26 may be hoses, tubes, conduits or other similar structures for fluidly connecting the channels 14 to the filter 16.

The filter 16 receives the water collected by the channels 14 and filters the water to remove solid elements and other impurities from the water. The water collection system 12 may utilize any suitable filter for filtering the water captured by the channels 14.

The tank 18 is adapted to store the collected and filtered water after it passes through the filter 16. The filter 16 may be directly connected to the tank 18 or may be fluidly connected to the tank 18 by additional tubing 28. The tank 18 may include any size and shape for storing the filtered water. In a non-limiting embodiment, the tank 18 is mounted near a fuel tank (not shown) of the vehicle 10. However, the tank 18 could be mounted at any space efficient location of the vehicle 10. The mounting location of the tank 18 could vary for different vehicle models.

In another non-limiting embodiment, the tank 18 includes a drain 25 for removing the filtered water stored within the tank 18. The drain 25 could include a removable plug, a spout for connecting a hose, or any other component for conveniently accessing the water stored in the tank 18.

The water collection system 12 may additionally include a control system 30, a human machine interface (HMI) 32, and one or more sensors 34. The control system 30 includes a processor 36 and memory 38. The control system 30 may include one more control modules equipped with executable instructions for interfacing with and commanding operation of various components of the vehicle 10, including but not limited to the channels 14, the filter 16, and the tank 18 of the water collection system 12. Each such control module may include a processing unit 36 and non-transitory memory 38 for executing the various control strategies and modes of the water collection system 12.

The processing unit 36, in an embodiment, is configured to execute one or more programs stored in the memory 38 of the control system 30. A first exemplary program, when executed, may determine when to command deployment of a portion of the channels 14 of the water collection system 12 for collecting water. A second exemplary program, when executed, can display various information to the driver/operator on the HMI 32, such as a total percentage of the tank 18 that has been filled by water collected in the channels 14, for example. The control system 30 may additionally control various other functions associated with the water collection system 12.

The HMI 32 is typically located inside the vehicle passenger cabin and may be used to either display information to a driver/operator or allow the driver/operator to enter information (i.e., user commands) for executing various tasks associated with the water collection system 12. The HMI 32 could include a touchscreen and/or a series of tactile buttons for entering information, and could include a touchscreen and/or a series of gauges for displaying information to the user. The HMI 32 is in electrical communication with the control system 30.

The one or more sensors 34 may be positioned at various locations throughout the vehicle 10 for detecting the presence of water on the vehicle 10. For example, the sensors 34 may be positioned near the windshield or other windows of the vehicle 10. Once water has been detected, the sensor(s) 34 communicate with the control system 30, and based on this information, the control system 30 may determine whether or not to deploy certain channels 14 of the water collection system 12 for actively collecting and storing water. Thus, the sensors 34 and the control system 30 are also in electrical communication with one another. In a non-limiting embodiment, the sensor 34 is a light refraction sensor commonly used with automatic windshield wiper systems. However, other sensors may alternatively or additionally be utilized within the scope of this disclosure.

Figure 3:
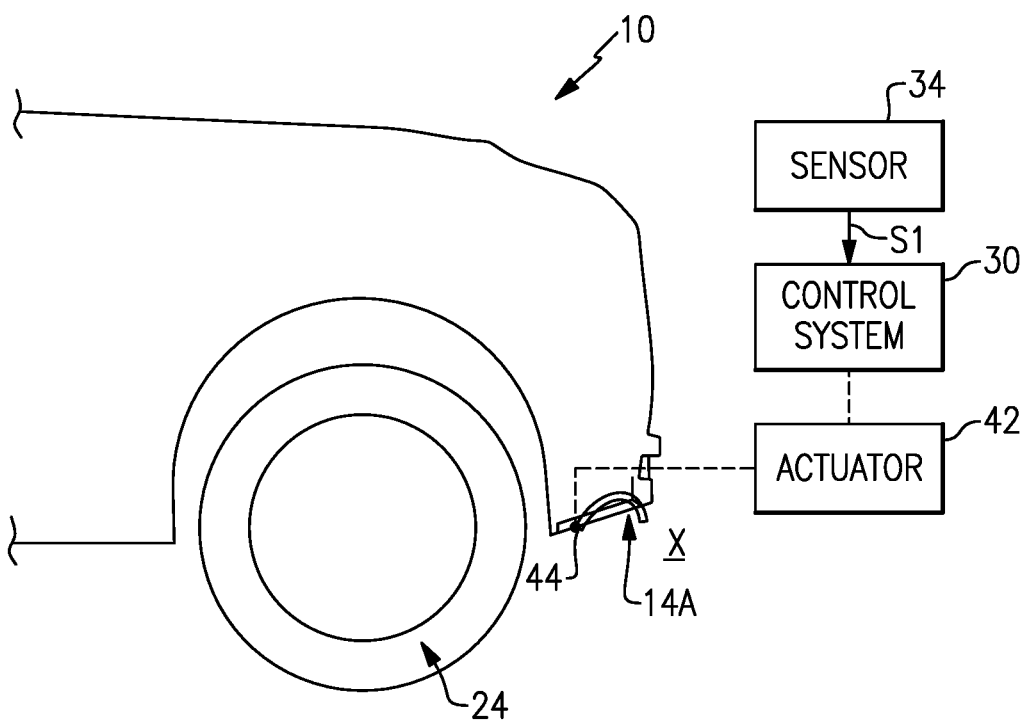
FIG. 3 illustrates a stowed position of a deployable channel of a vehicle water collection system.
Figure 4:
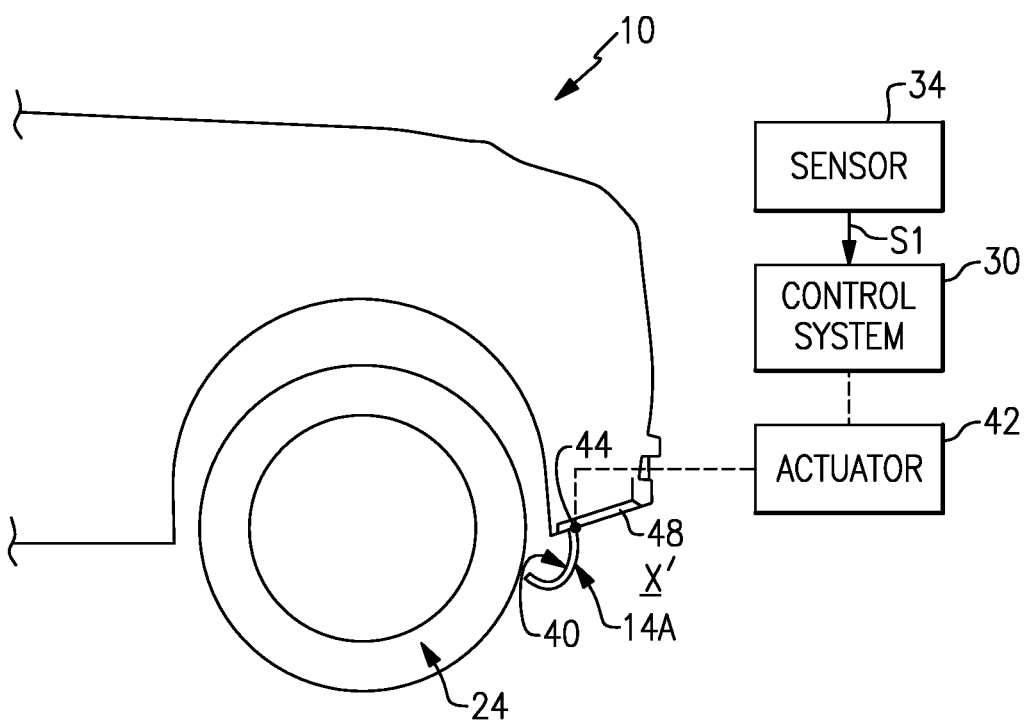
FIG. 4 illustrates a deployed position of the deployable channel of FIG. 3.

FIGS. 3 and 4 illustrate an exemplary channel 14A of the water collection system 12 described above. The channel 14A is considered a deployable channel of the water collection system 12. Although only a single deployable channel 14A is illustrated in these figures, the water collection system 12 could include multiple deployable channels similar to the channel 14A and which are positioned throughout the vehicle 10.

FIG. 3 illustrates the channel 14A in a stowed position X, whereas FIG. 4 illustrates the channel 14A in a deployed position X'. The channel 14A is positioned to collect water that falls on, around, and/or through the vehicle 10 when moved to the deployed position X'.

In a non-limiting embodiment, the channel 14A establishes a shallow trough 40 for catching and channeling the water in the deployed position X'. In another non-limiting embodiment, the channel 14A is curved and includes an arc-shaped design. However, the channel 14A could embody other sizes and shapes within the scope of this disclosure.

The channel 14A may be mounted just rear of the rear wheels 24 so it extends horizontally in the direction of the width of the vehicle 10. In a non-limiting embodiment, the channel 14A is mounted to a portion of a chassis 48 of the vehicle 10. The channel 14A could be mounted to any portion of the vehicle frame using known mounting techniques.

The channel 14A (or any other deployable channel) of the water collection system 12 may be automatically deployed. For example, the sensor 34 may send a signal S1 to the control system 30 if it detects the presence of water on the vehicle 10. In response to receiving the signal S1, and if the vehicle 10 is moving, the control system 30 commands an actuator 42 to move the channel 14A from the stowed position X to the deployed position X'. The actuator 42 may be an electronic actuator or any other suitable device. In another non-limiting embodiment, the actuator 42 and the control system 30 are integrated components. The actuator 42 moves the channel 14A about a pivot 44 until it reaches the deployed position X'. The channel 14A is capable of collecting water that falls on, around, and/or through the vehicle 10 once moved to the deployed position X'.

The channel 14A of the water collection system 12 may also deployed in response to a user command from the driver/operator of the vehicle 10. For example, the driver/operator may wish to deploy the channel 14A when washing the vehicle 10. In such as situation, the user can deploy the channel 14A by activating a "car wash mode" using the HMI 32, as further discussed below.

Figure 5:
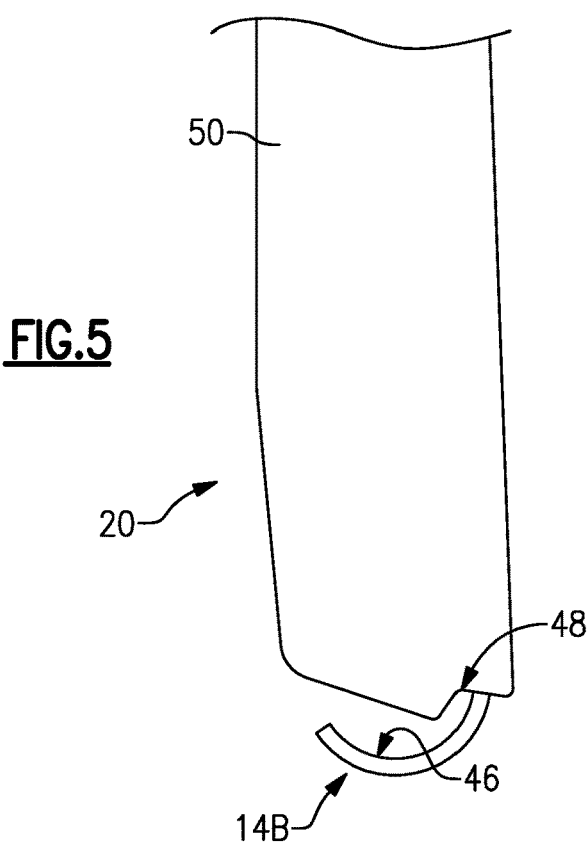
FIG. 5 illustrates a stationary channel of a vehicle water collection system.

FIG. 5 illustrates another exemplary channel 14B of the water collection system 12. The channel 14B is a stationary channel of the water collection system 12. In this embodiment, the channel 14B is always deployed and can collect water that falls on, around, and/or through the vehicle 10 at any time. In other words, unlike the channel 14A of the FIGS. 3 and 4, the channel 14B does not move between stowed and deployed positions.

In a non-limiting embodiment, the channel 14B establishes a shallow trough 46 for catching and channeling water. In another non-limiting embodiment, the channel 14B is curved and includes an arc-shaped design.

The channel 14B is positioned to extend along the side 20 of the vehicle 10. Although only a single stationary channel 14B is illustrated in FIG. 5, the water collection system 12 could include multiple stationary channels similar to the channel 14B. For example, an additional channel 14B could be positioned at the side 22 of the vehicle 10 (as shown, for example, in FIG. 1).

The channel 14B may be mounted between the front wheels 23 and the rear wheels 24 such that it extends longitudinally along the side 20 in the direction of the length of the vehicle 10 (into the page as depicted in FIG. 5). In a non-limiting embodiment, the channel 14B is mounted to a portion of the chassis 48 of the vehicle 10. In another embodiment, the channel 14B is mounted below a door panel 50 of the vehicle 10.

Figure 6:
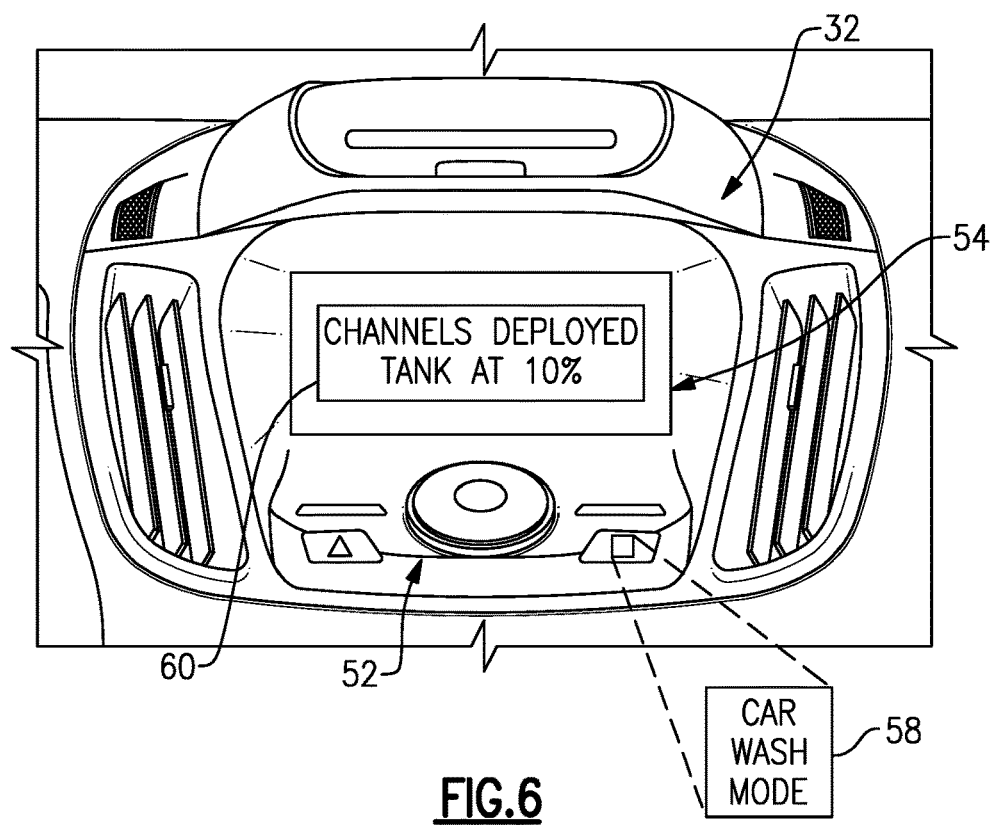
FIG. 6 illustrates an exemplary human machine interface (HMI) of a vehicle equipped with a water collection system.

FIG. 6 illustrates an exemplary HMI 32 of a vehicle 10 equipped with a water collection system 12. The HMI 32 may include a user input 52 and a display 54. The user input 52 may include various actuators, selectors, switches or the like for inputting various driver preferences and user commands for controlling the water collection system 12. For example, in a non-limiting embodiment, the user input 52 of the HMI 32 includes an actuator 58 which can be depressed or otherwise actuated for deploying one or more deployable channels (e.g., the channel 14A of FIGS. 3-4) of the water collection system 12. Although shown as part of the user input 52, the actuator 58 could alternatively or additionally be incorporated into the display 54.

The display 54, which may be a touchscreen display, displays information to the driver/operator and can also be used for inputting user commands for controlling the water collection system 12. The display 54 is capable of displaying various messages 60 to the driver/operator that pertain to the water collections system 12. In a non-limiting embodiment, the messages 60 include an indication of the fill level of the tank 18 of the water collection system 12.

Figure 7:
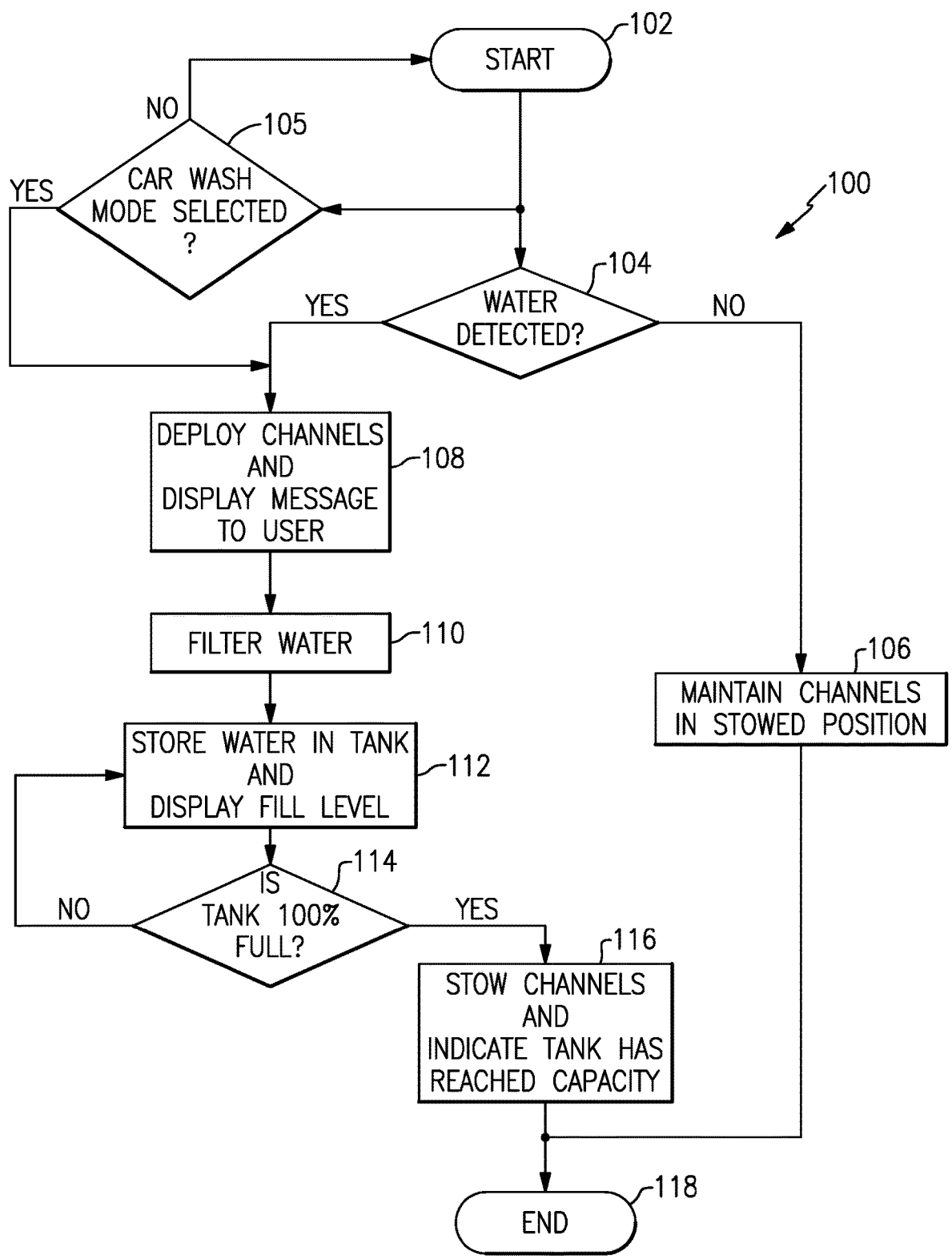
FIG. 7 illustrates a control strategy for collecting and storing water captured by a vehicle water collection system.

FIG. 7, with continued reference to FIGS. 1-6, schematically illustrates a control strategy 100 for controlling a water collection system 12 of a vehicle 10 in order to collect and store water that falls on, around, and/or through the vehicle 10. In a non-limiting embodiment, the control system 30 of the vehicle 10 is programmed with one or more algorithms adapted to execute the exemplary control strategy 100.

The exemplary control strategy 100 begins at block 102. At block 104, the control strategy 100 determines if the presence of water is detected at the vehicle 10. For example, the control system 30 may monitor the status of the sensor 34 to determine whether or not the signal S1 has been received indicating the presence of water at the windshield or some other location of the vehicle 10. If no water has been detected, the control strategy maintains the deployable channels 14A of the water collection system 12 stowed at block 106.

Alternatively, if water is detected at block 104, the control strategy 100 proceeds to block 108 by deploying each deployable channel 14A of the water collection system 12 to the deployed positions X'. This step may additionally include displaying a "deployed" message 60 on the display 54 of the HMI 32.

In another non-limiting embodiment, the control strategy 100 may execute block 108 in response to receiving a user command. For example, the user may select a "car wash mode" to deploy the deployable channels 14A of the water collection system 12 (shown schematically at block 105). The "car wash mode" may be selected by actuating the actuator 58 of the HMI 32.

The water collected by the channels 14 is communicated to the filter 16 and is filtered at block 110. The filtered water is stored in the tank 18 at block 112. The tank 18 fill level may be displayed on the HMI 32.

Next, at block 114, the control strategy 100 determines whether the tank 18 is full. If no, the control strategy 100 allows water to continue to fill the tank 18. If yes, the control strategy 100 proceeds to block 116 by stowing the deployable channels 14A and displaying the message 60 on the HMI 32 indicating the tank 18 has reached its capacity. The control strategy 100 ends at block 118.

FIG. 8 schematically illustrates several exemplary uses for recycling water 99 that has been collected by the water collection system 12 and stored in the tank 18. The collected water 99 may recycled for various non-vehicle uses 70 and/or for various vehicle uses 72. The non-vehicle uses 70 could include using the water 99 for gardening (shown schematically at 74) or various household chores (shown schematically at 76). The water 99 could be recycled for various other non-vehicle uses within the scope of this disclosure. A hose 84 or other similar device may be connected to the tank 18 for removing the water 99 from the tank 18 for such uses. The hose 84 could be connected to the tank 18 at a threaded connection 97, for example. In an embodiment, the water 99 may drain from the tank 18 via gravity.

The vehicle uses 72 could include using the water 99 to clean the vehicle windshield 78 or for cooling the vehicle brakes 80. The water 99 could be recycled for various other vehicle uses within the scope of this disclosure. Conduits 82 may extend between the tank 18 and the windshield 78/brakes 80 for directing the water 99 to these or other components.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
    a water collection system including:
        a deployable channel movable between a stowed position and a deployed position for capturing water, wherein, in the deployed position, the deployable channel is arranged to capture water that flows over or around the vehicle or that is deflected by a wheel of the vehicle;
        a filter for filtering the water collected by the deployable channel; and
        a tank for storing the water filtered by the filter.

2. The vehicle as recited in claim 1, comprising a stationary channel arranged to capture water that flows over an exterior panel of the vehicle.

3. The vehicle as recited in claim 1, wherein the wheel is a rear wheel, and further wherein the deployable channel is mounted to the vehicle at a location that is rearward of the rear wheel of the vehicle.

4. The vehicle as recited in claim 1, comprising a control system adapted to command movement of the deployable channel from the stowed position to the deployed position in response to detecting the presence of water.

5. The vehicle as recited in claim 4, comprising a sensor adapted to detect the presence of the water.

6. The vehicle as recited in claim 5, wherein the sensor is a light refraction sensor.

7. The vehicle as recited in claim 4, comprising an actuator adapted to move the deployable channel from the stowed position to the deployed position.

8. The vehicle as recited in claim 4, wherein the control system includes a processor and a memory, and the processor is configured to execute a program stored on the memory, wherein the program determines when to move the deployable channel from the stowed position to the deployed position.

9. The vehicle as recited in claim 1, comprising tubing that fluidly connects the deployable channel to the filter.

10. The vehicle as recited in claim 1, comprising tubing that fluidly connects the filter to the tank.

11. The vehicle as recited in claim 1, wherein the deployable channel is mounted horizontally between rear wheels of the vehicle.

12. The vehicle as recited in claim 11, comprising a stationary channel mounted longitudinally between the rear wheels and front wheels of the vehicle.

13. The vehicle as recited in claim 1, wherein the tank includes a drain.

14. The vehicle as recited in claim 1, wherein the deployable channel is curved to establish a trough for capturing and channeling the water.

15. The vehicle as recited in claim 1, wherein the vehicle includes a human machine interface having an actuator for commanding the deployable channel to the deployed position.

16. The vehicle as recited in claim 1, wherein the deployable channel is mounted to a portion of a chassis of the vehicle.

17. The vehicle as recited in claim 1, wherein, in the stowed position, a trough of the deployable channel faces toward a ground surface upon which the vehicle is positioned, and in the deployed position, the trough faces in a direction away from the ground surface.

18. The vehicle as recited in claim 1, wherein, in the stowed position, a trough of the deployable channel is positioned at a first distance rearward of the wheel of the vehicle, and in the deployed position, the trough is positioned at a second distance rearward of the wheel, wherein the first distance is a greater distance than the second distance.

19. The vehicle as recited in claim 1, wherein the deployable channel is curved and includes an arc-shaped design.

20. The vehicle as recited in claim 1, wherein the deployable channel is movable about a pivot between the stowed position and the deployed position.

21. A vehicle, comprising:
    a rear wheel;
    a deployable channel mounted rearward of the rear wheel and movable between a stowed position and a deployed position,
        wherein the deployable channel extends along a first longitudinal axis that is parallel with a width of the vehicle,
        wherein the deployable channel is curved and includes an arc-shaped design;
    a door that includes a door panel;
    a stationary channel extending below the door panel,
        wherein the stationary channel extends along a second longitudinal axis that is parallel with a length of the vehicle;
    a sensor configured to detect a presence of water on the vehicle;
    a human machine interface that includes an actuator for selecting a car wash mode of the vehicle; and
    a control system configured to automatically move the deployable channel from the stowed position to the deployed position in response to a first input signal from the sensor indicating the presence of the water or in response to receiving a second input signal from the human machine interface indicating that the actuator has been actuated, wherein the control system includes a processor and a memory.

\* \* \* \* \*